(12) United States Patent
Caveney et al.

(10) Patent No.: US 11,081,026 B2
(45) Date of Patent: Aug. 3, 2021

(54) SELF-LAMINATING ROTATING CABLE MARKER WITH BREAKAWAY PORTION

(71) Applicant: Panduit Corp., Tinley Park, IL (US)

(72) Inventors: Jack E. Caveney, North Palm Beach, FL (US); David Scott Morrison, Cumming, GA (US); Michael Scott Adams, Cumming, GA (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 16/859,280

(22) Filed: Apr. 27, 2020

(65) Prior Publication Data
US 2020/0258429 A1    Aug. 13, 2020

Related U.S. Application Data

(63) Continuation of application No. 16/680,828, filed on Nov. 12, 2019, now Pat. No. 10,636,328, which is a
(Continued)

(51) Int. Cl.
*G09F 3/00* (2006.01)
*G09F 3/10* (2006.01)
(Continued)

(52) U.S. Cl.
CPC .......... *G09F 3/0295* (2013.01); *B32B 37/142* (2013.01); *G09F 3/02* (2013.01);
(Continued)

(58) Field of Classification Search
CPC ............... B32B 2519/00; B32B 37/142; Y10T 428/149; Y10T 428/14; Y10T 428/28;
(Continued)

(56) References Cited

U.S. PATENT DOCUMENTS

| 1,463,755 A | 7/1923 | West |
| 2,914,166 A | 11/1956 | Eihler |
| (Continued) | | |

FOREIGN PATENT DOCUMENTS

| DE | 202005021430 U1 | 1/2008 |
| EP | 0535843 A2 | 4/1993 |
| EP | 1313082 A2 | 5/2003 |

OTHER PUBLICATIONS

HellermannTyton label product presentation, Sep. 20, 2006, pp. 1 & 23.
(Continued)

*Primary Examiner* — Vishal I Patel
(74) *Attorney, Agent, or Firm* — Christopher S. Clancy; James H. Williams; Christopher K. Marlow

(57) ABSTRACT

A self-laminating rotating cable marker label is constructed of a transparent film having a first adhesive area, an adhesive-free smooth area, and a second adhesive area. A print-on area forms one side of the transparent film, the print-on area adapted to receive indicia identifying the cable about which the marker label is applied. A perforation extends across the transparent film providing a line of separation of the transparent film. When wrapped around a cable, the second adhesive area overlies the print-on area such that the cable identifying indicia is visible through the transparent second adhesive area. As the transparent film is wrapped around the cable, the first adhesive area adheres to the cable. The remainder of the transparent film is rotated, breaking the perforation, whereby the smooth area of the film in contact with the cable provides smooth rotation of the label around the cable.

1 Claim, 10 Drawing Sheets

Related U.S. Application Data continuation of application No. 16/383,955, filed on Apr. 15, 2019, now Pat. No. 10,482,794, which is a continuation of application No. 15/262,561, filed on Sep. 12, 2016, now Pat. No. 10,262,562, which is a continuation of application No. 14/485,960, filed on Sep. 15, 2014, now Pat. No. 9,443,449, which is a continuation of application No. 13/586,637, filed on Aug. 15, 2012, now abandoned, which is a continuation of application No. 12/437,187, filed on May 7, 2009, now Pat. No. 8,263,201.

(60) Provisional application No. 61/051,976, filed on May 9, 2008.

(51) Int. Cl.
  *B32B 37/14* (2006.01)
  *G09F 3/02* (2006.01)
  *G09F 3/20* (2006.01)

(52) U.S. Cl.
  CPC ............... *G09F 3/10* (2013.01); *G09F 3/205* (2013.01); *B32B 2519/00* (2013.01); *G09F 2003/0255* (2013.01); *Y10T 428/14* (2015.01); *Y10T 428/149* (2015.01); *Y10T 428/15* (2015.01); *Y10T 428/28* (2015.01); *Y10T 428/2839* (2015.01)

(58) Field of Classification Search
  CPC . Y10T 428/2839; Y10T 428/15; G09F 3/205; G09F 3/10; G09F 2003/0255; G09F 3/0295; G09F 3/02
  See application file for complete search history.

(56) References Cited

U.S. PATENT DOCUMENTS

| | | | |
|---|---|---|---|
| 2,818,168 A | 12/1957 | Tobey et al. | |
| 3,068,600 A | 12/1962 | Blanchet | |
| 3,854,229 A | 12/1974 | Morgan | |
| 4,268,986 A | 5/1981 | Fiana | |
| 4,312,523 A | 1/1982 | Haines | |
| 4,465,717 A | 8/1984 | Crofts | |
| 4,579,759 A * | 4/1986 | Breuers | H01B 7/36 174/112 |
| 4,609,208 A | 9/1986 | Wrobel | |
| 4,636,271 A | 1/1987 | Gandolfo | |
| 4,656,767 A | 4/1987 | Tarrant | |
| 4,876,810 A | 10/1989 | Piana et al. | |
| 4,884,827 A | 12/1989 | Kelley | |
| 4,899,474 A | 2/1990 | Piana et al. | |
| 4,947,568 A | 8/1990 | DeBarbieri | |
| 4,951,596 A | 8/1990 | Wallace, Jr. | |
| 5,111,605 A | 5/1992 | Bossi | |
| 5,115,586 A | 5/1992 | Hawker | |
| 5,157,853 A | 10/1992 | Piana et al. | |
| 5,187,854 A | 2/1993 | Bossi | |
| 5,195,783 A | 3/1993 | Lavoie | |
| 5,275,282 A | 1/1994 | Ross et al. | |
| 5,366,575 A | 11/1994 | Staff et al. | |
| 5,588,239 A | 12/1996 | Anderson | |
| D388,833 S | 1/1998 | Wilson | |
| 5,704,649 A | 1/1998 | Small | |
| 5,707,704 A | 1/1998 | Ako et al. | |
| 5,974,708 A | 11/1999 | Webb et al. | |
| 6,073,377 A | 6/2000 | Mehta | |
| 6,990,761 B1 | 1/2006 | Cox | |
| 7,087,298 B2 | 8/2006 | Key | |
| 7,194,829 B2 | 3/2007 | Boire et al. | |
| D565,729 S | 4/2008 | Stephens | |
| D565,730 S | 4/2008 | Stephens | |
| D567,372 S | 4/2008 | Chesnin | |
| D569,972 S | 5/2008 | Schweikert | |
| D571,005 S | 6/2008 | Chesnin et al. | |

OTHER PUBLICATIONS

Hitachi Electric Systems Co., Ltd., label design, Jun. 15, 2007, 2 pages.

* cited by examiner

SELF-LAMINATING ROTATING CABLE MARKER WITH BREAKAWAY PORTION

CROSS-REFERENCE TO RELATED APPLICATIONS

This application is a continuation of U.S. patent application Ser. No. 16/680,828, filed Nov. 12, 2019, which issued as U.S. Pat. No. 10,636,328 on Apr. 28, 2020; which is a continuation of U.S. patent application Ser. No. 16/383,955, filed Apr. 15, 2019, which issued as U.S. Pat. No. 10,482,794 on Nov. 19, 2019; which is a continuation of U.S. patent application Ser. No. 15/262,561, filed Sep. 12, 2016, which issued as U.S. Pat. No. 10,262,562 on Apr. 16, 2019; which is a continuation of U.S. patent application Ser. No. 14/485,960, filed Sep. 15, 2014, which issued as U.S. Pat. No. 9,443,449 on Sep. 13, 2016; which is a continuation of U.S. patent application Ser. No. 13/586,637, filed on Aug. 15, 2012, which is a continuation of U.S. patent application Ser. No. 12/437,187, filed on May 7, 2009, which issued as U.S. Pat. No. 8,263,201 on Sep. 11, 2012, which claims priority to U.S. Provisional Patent Application No. 61/051,976, filed on May 9, 2008. Each of these applications is incorporated by reference in its entirety.

FIELD OF THE INVENTION

The invention relates to a cable identification label that rotates about the cable to allow the label to be read at any position and, more particularly, to a self-laminating cable marker label with a breakaway portion that allows the label to rotate on the cable after installation, and permits the label to be applied to a terminated cable without disconnecting a previously connected cable.

BACKGROUND

It is important that cables used to make electrical and mechanical connections between control, operating, and other systems be properly labeled to allow cables to be moved, added to such systems, changed, repaired, and/or identified for trouble shooting maintenance. In some cases, such labels are required, such as to meet ANSI/TIA/EIA-606-A compliance pursuant to the Administrative Standard for Commercial Telecommunications Infrastructure (2002).

Presently available labels used to mark cables have an adhesive surface and an opposed printable surface, with the cable marker indicia applied to the printable surface. The adhesive side of the label attaches to the outer insulation layer surrounding the cable, such that the label is not rotatable around the cable. Thus, in certain cable installation environments, the cable marker label may be facing in a direction whereby the markings on the label are not visible to an observer, and the adhesive attaching the label to the cable prevents the label from being rotated around the cable for ease of observation.

Other presently available cable marker labels comprise a hollow cylindrical label with cable identification markings imprinted on the outer surface of the cylindrical label. These labels are capable of rotating when applied over a cable; however, one end of the cable must be disconnected to allow one of these cylindrical labels to be installed over the cable, or the cylindrical label must be applied over the cable prior to installation. The disconnection of one end of the cable to apply a rotatable label presents a high degree of inconvenience, and potential for error, where a great number of cables are attached to connecting points in a small space, as is usually the case in most cable installations. In addition, those working in the industry have discovered that it is advisable to apply a cable marker label to a cable after connection of the cable at both ends to maintain necessary quality and accuracy of the total installation.

A further presently available cable marker label, such as the Cable Identification System disclosed in U.S. Pat. No. 6,651,362, owned by Panduit Corp., comprises a two-piece split sleeve label spacer positioned circumferentially around a cable, and an adhesive label secured circumferentially around the label spacer.

Another cable marker presently available comprises a rotatable label strip with a write-on area on the front side of the label strip, and a partial adhesive on the back of the label strip opposite the write-on area. One end of the strip is wrapped around the cable and attaches to the adhesive side. This strip is not capable of adjusting to the size of the cable, nor of providing a protective over-laminate segment to protect the printed-on indicia against smudging or erasure.

Therefore, there is a need for a cable marker label that is rotatably applied to the cable, can be applied to terminated cable without disconnecting an end of the cable connection, can be applied over a cable in a matter of seconds, is a one-piece or two-piece construction, provides a clear, protective over-laminate segment covering the print-on area, and is inexpensive to manufacture.

SUMMARY OF THE INVENTION

A self-laminating cable marker label with a breakaway portion is provided that allows rotation of the label on the cable after installation. This allows the label to be rotated on the cable and be read from any position. The label in one embodiment comprises a strip of transparent film material having a first pressure sensitive adhesive area applied over a first portion of one side of the film, a second portion of the film comprising a print-on or pre-printed label area with an adhesive-free smooth undersurface having a low coefficient of friction, and a third clear over-laminate portion of the film having a second pressure sensitive adhesive area applied over the third portion on the same side of the film as the first adhesive area. A breakaway perforation is applied to the film at or adjacent the junction between the first adhesive area and the print-on label area. The transparent film material is thin so as not to materially add to the profile of the cable.

The film is wrapped around the cable over an approximate four hundred fifty degree distance, with the first adhesive layer engaging and adhering to the cable and also engaging and adhering to a portion of the film as the wrap extends beyond three hundred sixty degrees. The wrapping of the film about the cable continues until the print-on or pre-printed, non-adhesive label portion of the film is wrapped around the cable over an approximate four hundred fifty degree distance. The cable is held against rotation, while a tangent force is applied to the unwrapped portion of the label. The second pre-printed label portion and the third adhesive portion of the film break from the first portion of the film along the perforation, such that the first film portion remains adhesively secured to the cable. After separation, the third over-laminate portion is adhesively attached to the upper surface of the label area by continuing to wrap the film around the label, thus providing a protective layer over the print-on area of the rotatable label portion. The pre-printed label portion and the clear over laminate portion are free to rotate about the outer, non-adhesive surface of the first film portion. Since the outwardly facing surface of the film underlying the pre-printed label portion and the underside of the pre-printed label portion are adhesive free, the pre-printed label portion is able to achieve three hundred sixty degree rotation around the cable.

In a further embodiment, a two-piece self-laminating rotatable cable marker label is provided comprising a first clear material partially attached to a throw-away liner or substrate on one side of the label by a pressure sensitive adhesive, with a second non-adhesive, low coefficient of friction material also adhesively attached to the same side of the second clear material as the substrate. A print-on or pre-printed area is disposed on a portion of the opposite side of the first clear material. A perforation extends through the non-adhesive material and the clear material, and a cable-identifying indicia is printed or pre-printed on the print-on area. The cable marker label is removed from the substrate, and is then wrapped around the cable with a portion of the pressure sensitive adhesive anchoring an end of the first clear material to the cable. As the cable marker label continues to be wrapped around the cable, the second non-adhesive material layer contacts the outer surface of the cable over a circumferential extent that varies in relation to the diameter of the cable. As wrapping continues, the underside of clear smooth material extends over the outer side of the first clear material, and the adhesive causes the first clear material to adhere to itself, simultaneously protectively covering the print-on area with the first clear material. The indicia on the print-on area is visible through the clear material and the clear adhesive layer. The outer wrapping of the clear material is then gripped and slightly rotated in the same direction as the previous wrapping operation. The second non-adhesive material and the first clear material portion anchored to the cable then separate along the perforation, whereby the remainder of the second non-adhesive clear material and its print-on area are free to rotate around the circumference of the cable, with the low-coefficient, non-adhesive second material the only part of the rotatable cable marker label that is in contact with the cable surface.

BRIEF DESCRIPTION OF THE DRAWINGS

Certain examples of the present invention are illustrated by the accompanying figures. It should be understood that the figures are not necessarily to scale and that details that are not necessary for an understanding of the invention, or that render other details difficult to perceive, may be omitted. It should be understood, of course, that the invention is not necessarily limited to the particular examples illustrated herein.

DETAILED DESCRIPTION

Figure 1:
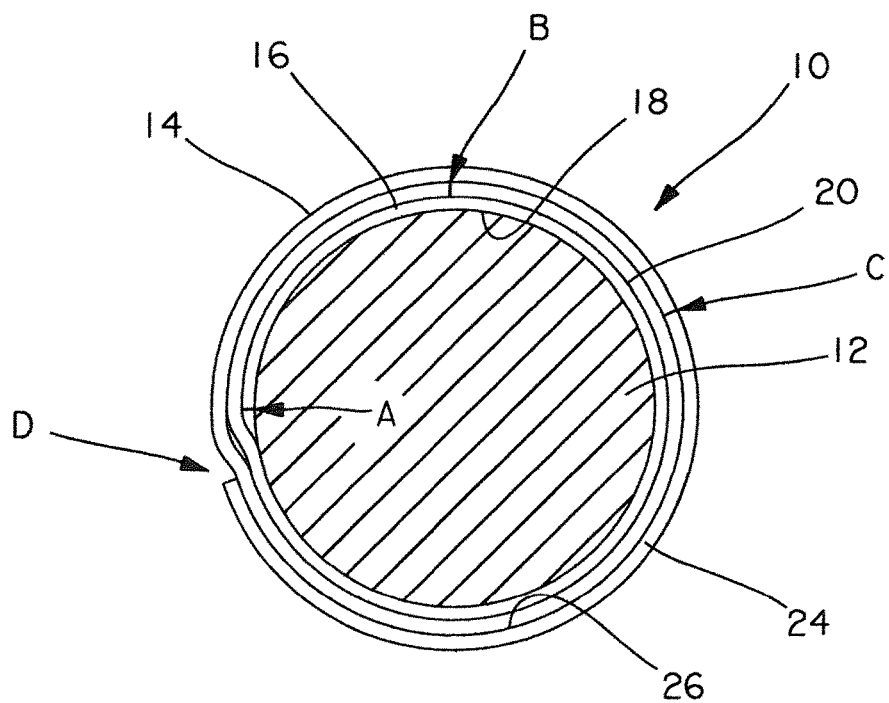
FIG. 1 is a cross-sectional view of an embodiment of the rotatable film and label combination strip of an embodiment of the present invention wrapped around a cable, showing the different portions of the film and the location of the perforation in the illustrated embodiment.
Figure 2:
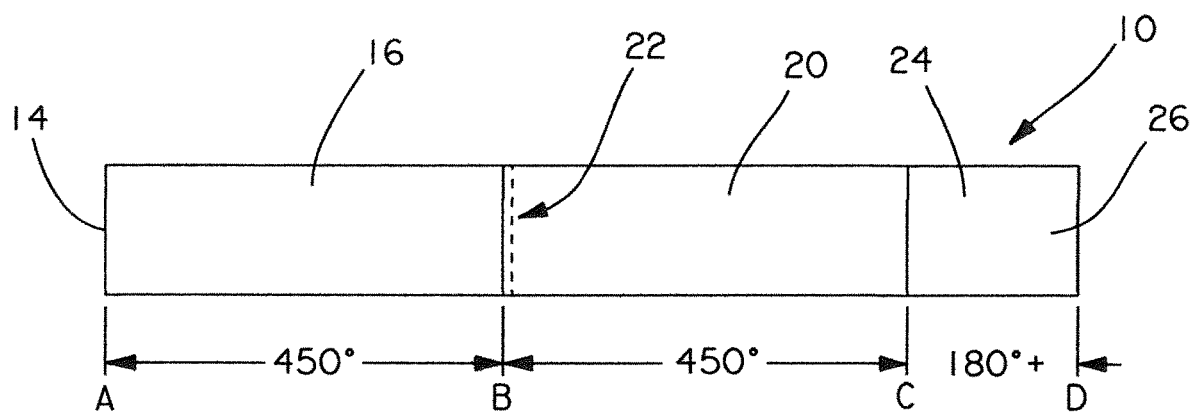
FIG. 2 is a plan view of the film and label combination strip of the embodiment of the invention illustrated in FIG. 1, showing the location of the first adhesive pressure sensitive area of the film, the second print-on or pre-printed label portion, the third over laminate portion, and the location of the perforation between the first and second portions of the illustrated embodiment.

Referring to FIGS. 1 and 2, an embodiment of the self-laminating rotating cable marker label of the present invention is illustrated. FIG. 1 shows the combination film and label strip 10 wrapped around a cable 12. Cable 12 is normally surrounded by a cable jacket (not shown). Referring to FIGS. 1 and 2, the combined film and label strip 10 comprises an elongated strip of thin film material 14 made of transparent flexible material such as vinyl, polyolefin, polyester or other suitable material. The film material 14 comprises a first portion or area 16 having a pressure sensitive adhesive applied to the underside 18 (FIG. 1). A second portion of strip 14 comprises a print-on or pre-printed label area 20. No adhesive is applied to the underside of printed label area 20, and the underside of strip 14 opposite area 20 has a low friction outer facing surface. In an embodiment, the printed label area 20 is located on a second side of strip 14 opposite the underside 18 of strip 14. A perforation 22 extends through the film strip 14 and across the width of strip 14 adjacent or at the junction of first adhesive area 16 and printed label area 20. Strip 14 also includes a third clear over-laminate portion 24 having a transparent pressure sensitive adhesive area 26 applied to the underside, such that third portion 24 provides a clear, transparent over-laminate area, for purposes to be explained.

Referring to FIG. 2, the forward end of the strip 14 is designated A, the general location of perforation 22 is designated B, the end of the printed label area 20 is designated C, and the trailing end of strip 14 is designated D. As seen in the embodiment of the invention described in FIG. 1, when strip 14 is initially wrapped around cable 12, the adhesive area 16 extending along strip 14 between A and B attaches first adhesive area 16 to cable 12, providing an anchor for further wrapping strip 14 around cable 12. In the illustrated embodiment, first adhesive area 16 of strip 14 is wrapped a distance greater than three hundred sixty degrees around cable 12, for example four hundred fifty degrees as suggested in FIG. 2, such that first adhesive area 16 is attached to cable 12 over a circumferential distance relative to the diameter of the cable 12. In addition, first adhesive area 16 is attached to itself over ninety degrees in the illustrated embodiment of FIG. 1.

In the embodiment illustrated in FIG. 1, when first adhesive area 16 is wrapped a total of four hundred fifty degrees around cable 12, perforation 22 is in the position B shown in FIG. 1, with position B approximately ninety degrees from position A. However, the first adhesive area 16 may be wrapped around cable 12 over other circular distance ranges depending on the diameter of cable 12, such that first adhesive area 16 is always firmly anchored to cable 12. The angular wrapping parameters mentioned above are exemplary only, and other circular wrapping distances may be utilized within the scope of the present invention.

Referring to FIG. 1, when the strip 10 is applied to cable 12, printed label area 20 extends over the upper surface of first adhesive area 16 of label strip 14, such that printed label area 20 overlies first adhesive area 16 over a distance greater than three hundred sixty degrees. In the embodiment illustrated in FIG. 1, printed label area 20 extends four hundred fifty degrees beyond position B of perforation 22, as designated at position C. Other angular distances may also be suitable. Since the printed label area 20 does not have an adhesive bottom, the printed label area 20 is capable of circumferential rotative movement about the non-adhesive top side of first adhesive area 16 of strip 14 were the perforation 22 broken, as will be explained. The third clear over-laminate portion 24 of strip 14 extends over the printed label area 20 by a distance of one hundred eighty degrees to position D in the illustrated embodiment of FIG. 1; however, other angular distance ranges may be used as a result of varying diameter of cable 12. The over-laminate portion 24 is adhered to the outside of printed label area 20 due to adhesive area 26, and provides a protective transparent cover over the printed label area 20 to prevent smudging of the printed indicia as the installed label is manually rotated to a readable position.

Figure 14:
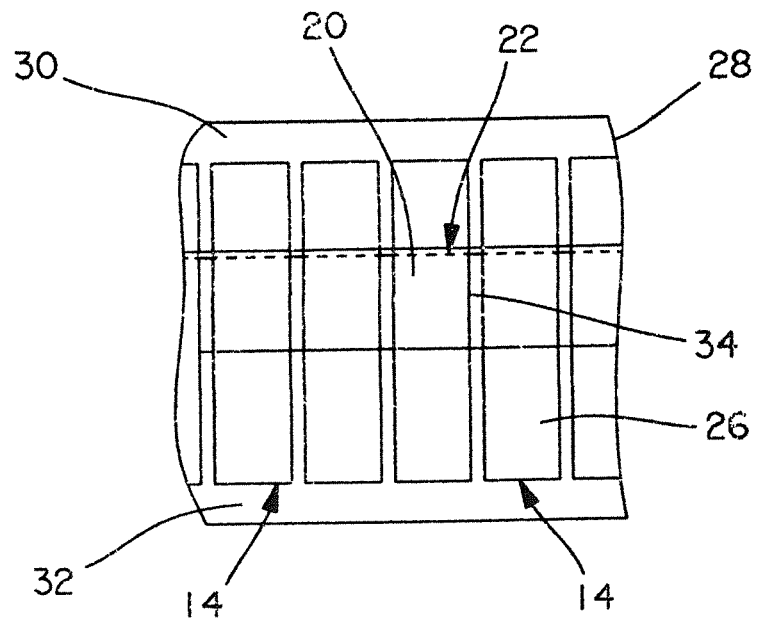
FIG. 14 is a plan view of a plurality of film and label strips of the embodiments illustrated in FIGS. 2, 8 and 12, shown removably adhered to a substrate following the mass production of the film and label combination strips of these embodiments.
Figure 15:
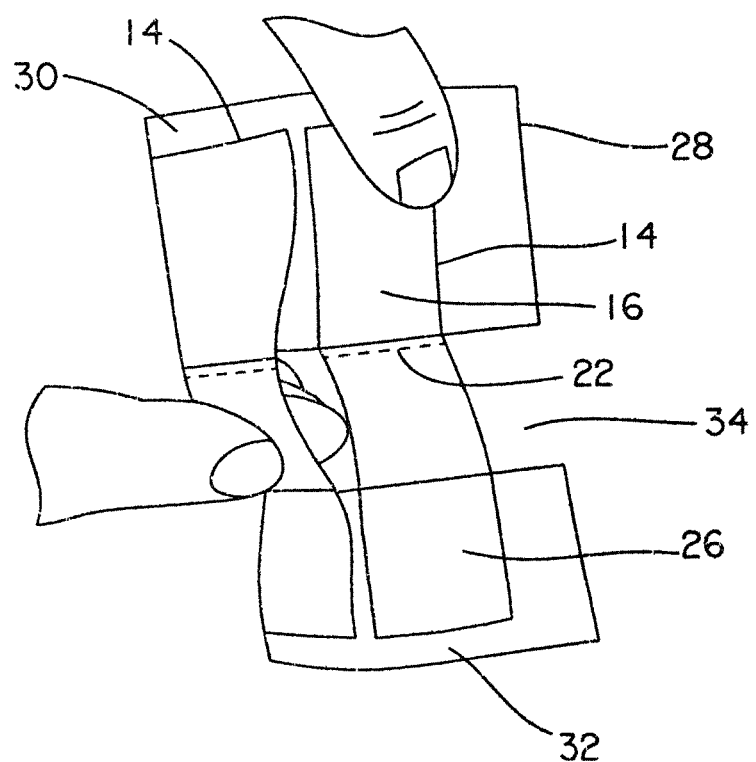
FIG. 15 is a schematic view showing the manual removal of a film and label strip from the substrate of FIG. 14.

The present invention contemplates in one embodiment, that a plurality of strips 14 will be provided to the user in a roll or other suitable form having the strips 14 removably adhered to a substrate 28 in a linear array (FIG. 14). The adhesive segments 16, 26 at both ends of strip 14 removably adhere the strip to the substrate 28, such that each strip 14 may be manually removed from substrate 28 when a label is to be applied to a cable 12, as illustrated in FIG. 15. Each strip 14 on substrate 28 includes perforation 22. In one embodiment, substrate 28 is formed in two parallel portions 30, 32, with an open space 34 beneath the printed label area 20 of the strip 14.

Figure 3:
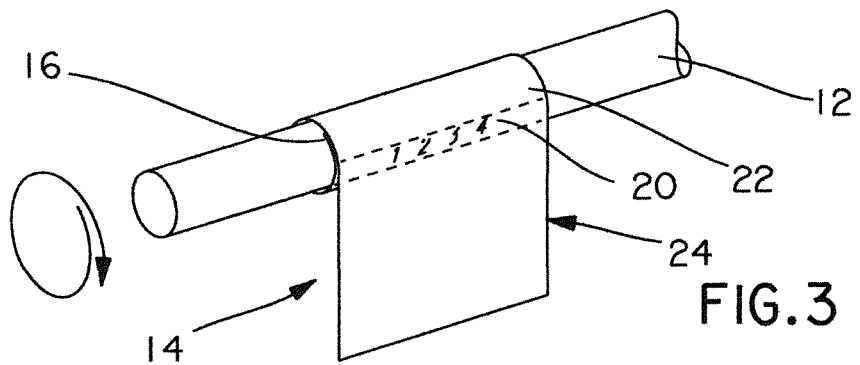
FIGS. 3-7 diagrammatically illustrate the steps of wrapping the transparent film and label combination strip of the embodiment of the present invention shown in FIGS. 1 and 2 around a cable, breaking the film along the perforation, applying the over laminate protective portion of the film over the print-on area of the label, and rotating the label once applied to the cable.

FIGS. 3-7 illustrate the unique method of applying the combined film and label strip 10 to a cable 12. First, a single strip of material 14 with a print-on or pre-printed label area 20 is manually removed from portions 30, 32 of substrate 28 (FIG. 15). As shown in FIG. 3, the first adhesive area 16 of strip 14 is tightly wrapped around cable 12 such that adhesive underside 18 anchors first portion 16 to cable 12. First adhesive area 16 is wrapped around cable 12 beyond three hundred sixty degrees, such that a segment of adhesive area 16 overlies and adheres to the upper surface of a previously wrapped segment of adhesive area 16, as shown between positions A and B in FIG. 1.

Figure 4:
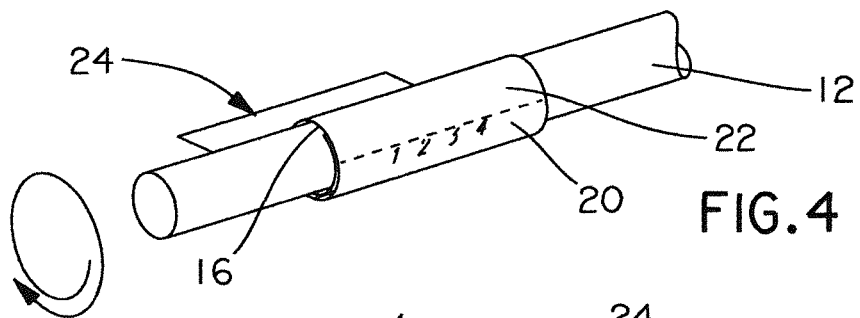
Figure 5:
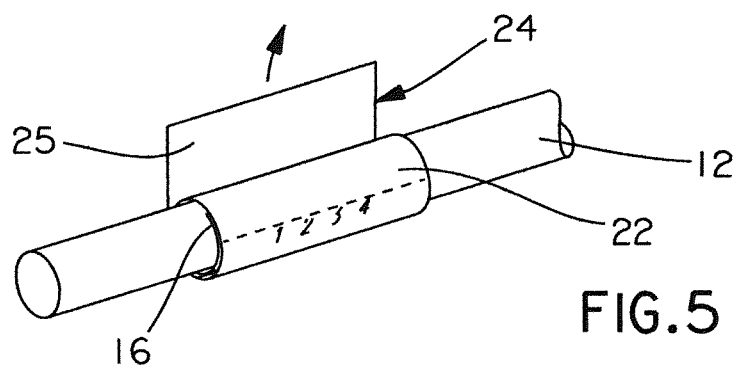
Figure 6:
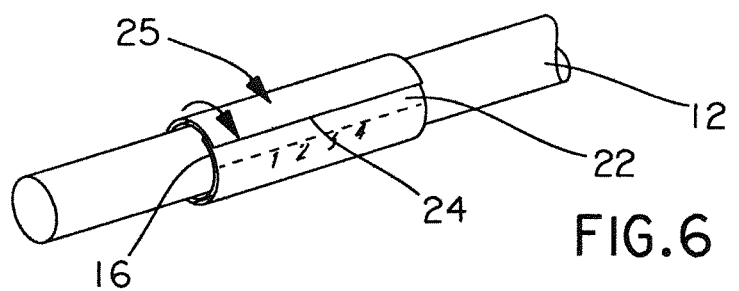
Figure 7:
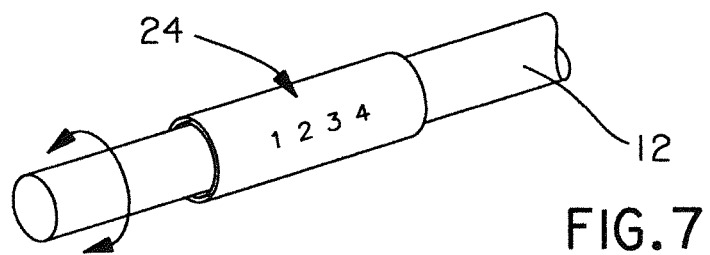

Referring to FIGS. 4 and 5, the wrapping process continues as printed label area 20 is wrapped over the upper, non-adhesive surface of first area 16 of strip 14. In the illustrated embodiment, label area 20 is wrapped over approximately a four hundred fifty degree distance around cable 12, extending from B to C as viewed in FIGS. 1 and 4. Pressure sensitive area 26 of over-laminate portion 24 of strip 14 is then partially adhesively adhered to a portion of label area 20 over an approximate ninety-degree extent in the illustrated embodiment. The wrapping steps are halted at this point, with the outer segment 25 of third over-laminate portion 24 of strip 14 extending outward from printed label area 20, as seen in FIG. 5. Next, the cable 12 is held against rotation, the label area 20 is grasped and pulled in a direction tangent to cable 12 in the direction of wrapping, applying a torsional force sufficient to separate first adhesive area 16 from printed label area 20 along perforation 22. After perforation 22 is broken, the remaining segment 25 of pressure sensitive over-laminate 24 is wrapped over and adhered to the label area 20, as shown in FIG. 6. As the perforation 22 breaks, printed label area 20 is free to rotate in either direction about the smooth outer surface of first adhesive area 16 of film material 14, as depicted in FIG. 7, and due to the smooth underside of printed label area 20 that is in contact with the smooth outer surface of first adhesive area 16 of film 14 over a distance of three hundred sixty degrees or more. In the illustrated embodiment, the smooth underside of printed label area 20 is coated with silicon to provide a low coefficient of friction between printed label area 20 and the non-adhesive upper surface of area 16.

Figure 8:
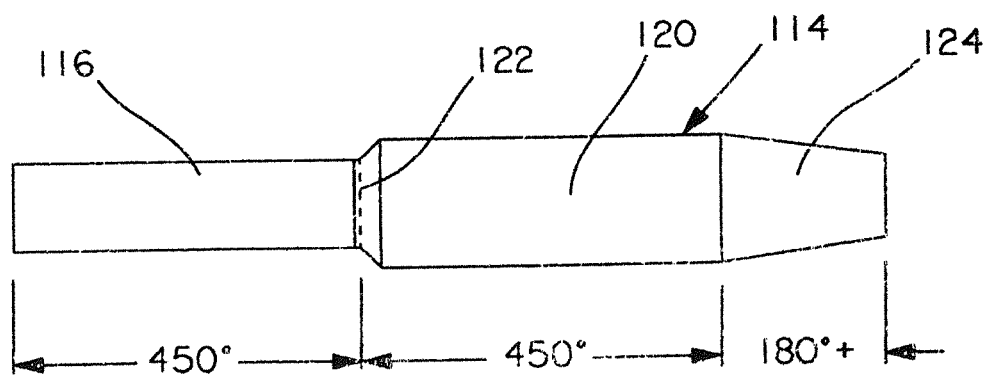
FIG. 8 is a plan view of another embodiment of the rotatable film and label combination strip of the present invention, providing overhanging ends of the printed label area for preventing migration of the printed label along the axis of the cable, and a construction that aids in compensating for undesirable wrapping in a non-circular direction.

FIGS. 8 through 11 disclose a further embodiment of the invention of FIGS. 1-7, configured to prevent axial movement of the combined film and label strip 10 after application to the cable 12. Referring to FIG. 8, strip of material 114, made from the same selection of materials as strip 14 of FIG. 2, comprises a first portion 116 having an adhesive underside and a non-adhesive top side, a second smooth printed label area 120, and a third clear over-laminate portion 124. The underside area 118 (FIGS. 9-11) of first portion 116 is coated with a pressure sensitive adhesive material, and the underside area of clear over laminate portion 124 is also coated with a similar adhesive material. Perforation 122 extends across strip 114 at or adjacent the junction between first portion 116 and printed label area 120.

As seen in FIG. 8, in this embodiment the lateral width of printed label area 120 is greater than the width of first portion 116 of strip 114. In addition, clear over-laminate portion 124 tapers inward from its junction with printed label area 120.

The method used to wrap and install strip 114 to cable 12 is the same as that described for the embodiment of FIGS.

Figure 9:
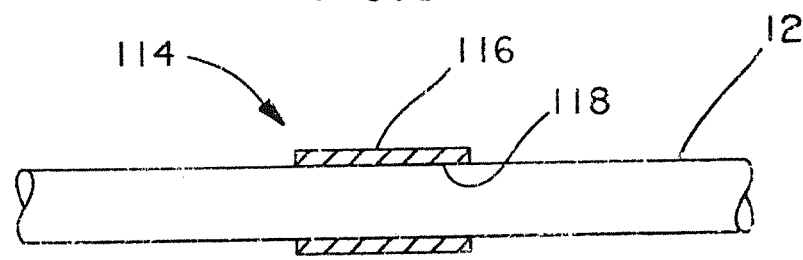
FIGS. 9-11 illustrate, in cross-section views, the method of applying the rotatable film and label combination strip of FIG. 8 to a cable.
Figure 10:
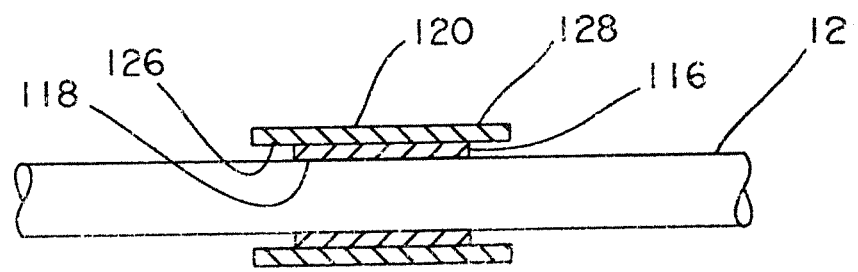
Figure 11:
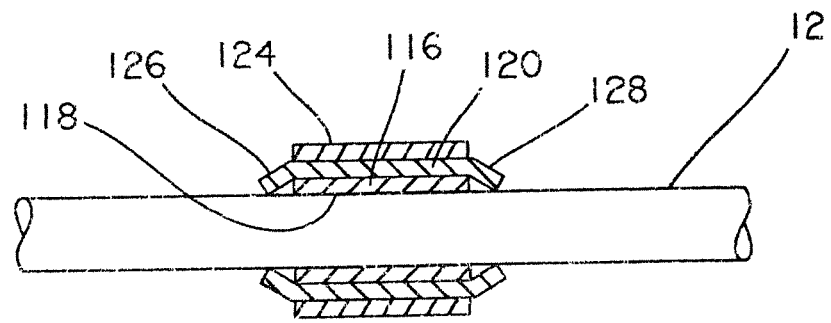

1-7. FIG. 9 shows, in cross-section, first portion 116 wrapped around, and adhesively adhered to, cable 12. FIG. 10 shows, in cross-section, the wider printed label area 120 slidably wrapped around first portion 116. FIG. 11 shows, in cross-section, clear over-laminate portion 124 wrapped around and adhesively adhered to printed label area 120.

As seen in FIG. 10, printed label area 120 is wrapped over first portion 116 of strip 114 such that lateral edges 126, 128 overhang the side edges of first portion 116. When applying strip 114 to cable 12, after over-laminate portion 124 is fully wrapped over the label area 120 and after perforation 122 has been broken, the user manually moves overhanging lateral edges 126 and 128 to the position shown in FIG. 11, engaging the side edges of first portion 116, and engaging cable 12. The lateral edges 126, 128 will remain in the position shown in FIG. 11 due to the tension applied to strip 114 during the wrapping process. As seen in FIG. 11, rotatable label area 120 is restrained against axial movement along cable 12 due to the contact of lateral edges 126, 128 with first portion 116 and cable 12.

As seen in FIG. 8, clear over-laminate portion 124 is tapered toward the outer end to compensate for possible side or off-center movement of the strip 114 during the aforementioned wrapping process.

Figure 12:
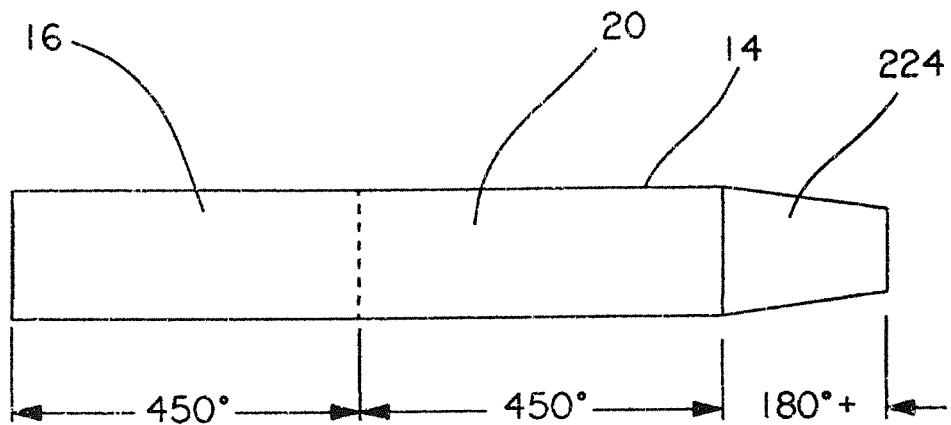
FIG. 12 is a further embodiment of the rotatable film and label combination strip of FIG. 8.
Figure 13:
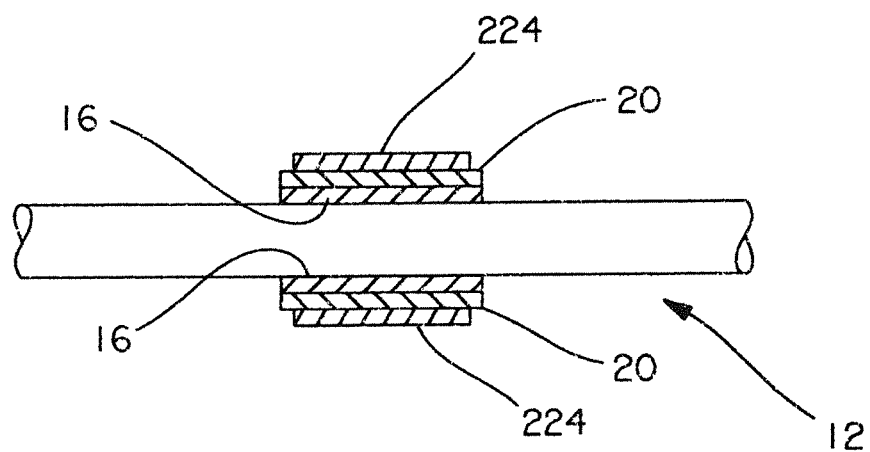
FIG. 13 is a cross-sectional view of the film and label combination strip of the embodiment of FIG. 12 shown wrapped around a cable.

FIGS. 12 and 13 depict an alternate embodiment of the invention shown in FIGS. 1-7 and 8-11. In this embodiment, first adhesive area 16 of strip 14 is the same width as printed label area 20, and the method of applying strip 14 of FIGS. 12 and 13 to cable 12 is the same as described above regarding the embodiment of FIGS. 1-7. In the embodiment of FIGS. 12 and 13, clear over laminate portion 224 is tapered inwardly towards an end of the strip. When strip 14 of FIG. 12 is wrapped around cable 12 as previously described, tapered over laminate portion 224 is positioned as shown in FIG. 13, adhesively fastened to printed label area 20. If the wrapping process used was slightly off center, the tapered portion 224 would engage label area 20 towards one lateral side or the other but would retain full engagement.

FIGS. 16-23 disclose an additional embodiment of the present invention comprising a two-piece, self-laminating cable marker label 300 that provides an outward force away from the cable jacket during application and use of the label. This outward force assists with wrapping the label slightly loose which makes it easier to rotate to break the perforation 314 and easier to rotate over the cable jacket once the label is disengaged from the anchor section 320.

The outward force in combination with a silicon coating or other slip agent on the side of the material adjacent to and contacting the cable jacket provides a looser, smoothly rotating label marker that can be read from all angles after installation. The two-material construction of the embodiment of the invention shown in FIGS. 16-23 also allows for added flexibility in material selection to achieve the desired performance characteristics for each section of the label. Characteristics include coefficient of friction of the outer surface for user grip during rotation, coefficient of friction of the inner surface for slip on the cable jacket, pliability and perforation tear characteristics. The two-material construction may also provide a simpler means of manufacturing the product when compared to other methods of creating a non-adhesive section on the label.

Figure 16:
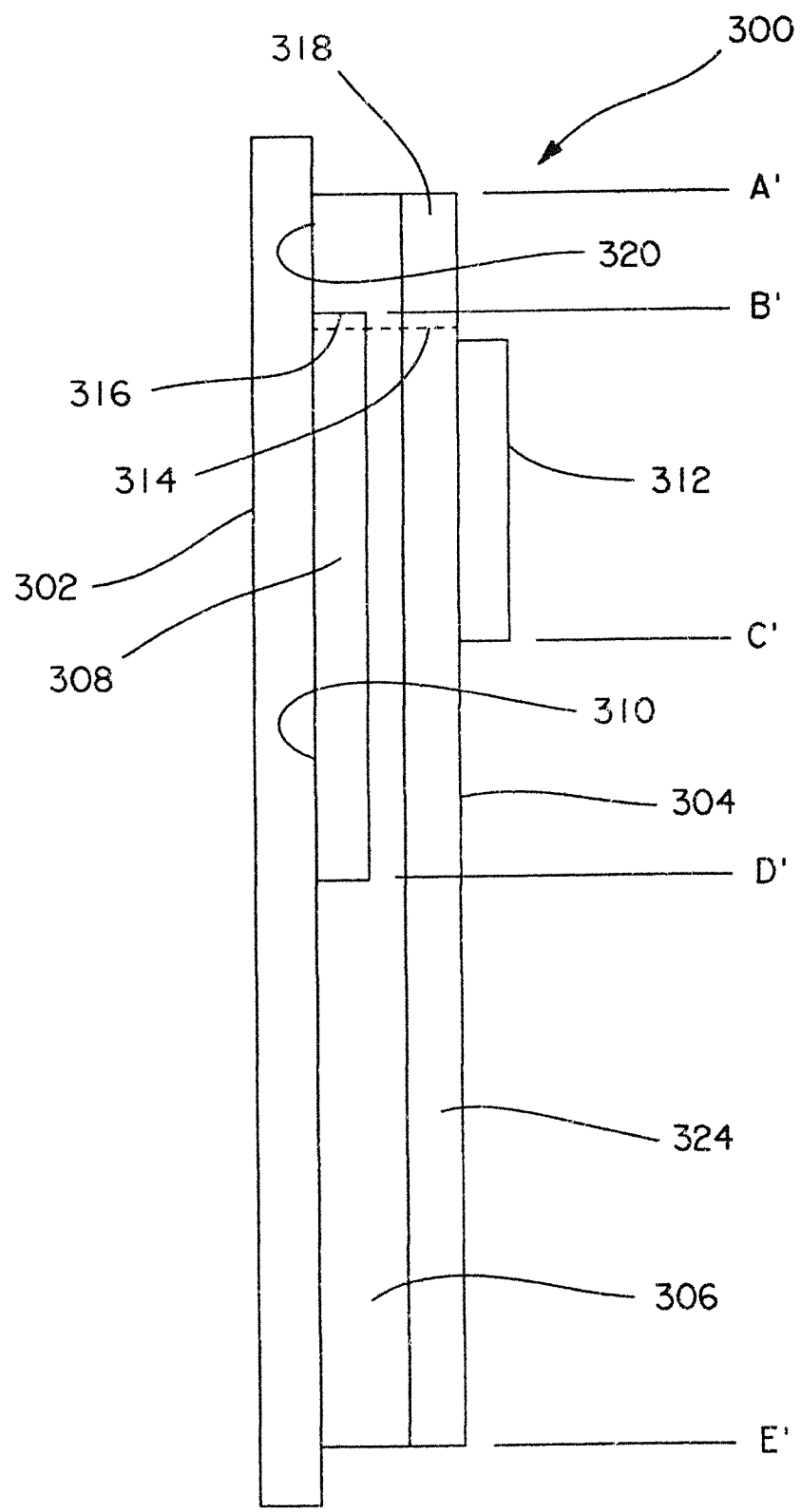
FIG. 16 is a cross-sectional view of a further embodiment of the invention comprising a two-piece construction.

Referring to FIG. 16, the illustrated embodiment of the invention is shown in exaggerated thickness and comprises a cable marker label 300 having a throw away liner or substrate 302 and a first clear transparent film material 304.

A thin pressure sensitive clear adhesive layer 306 is juxtaposed between the throw away liner or substrate 302 and the first clear material 304. A second non-adhesive clear material 308 is located between adjacent portions of substrate 302 and first clear material 304, the second non-adhesive material 308 being adhered to first clear material 304 by adhesive layer 306. Second non-adhesive material 308 is located at a distance from a leading edge of first material 304 by a distance between lines A'-B' in FIG. 16 to provide an anchor portion 320 for label 300, as will be explained. Second non-adhesive material 308 is longer in the lengthwise direction, shown by the distance B' to D' in FIG. 16, than the circumferential length about the cable to which cable marker label 300 is applied. Also, second non-adhesive material 308 may have a smooth silicon-coated outer surface 310 providing a low coefficient of friction when material 308 is applied over the cable or cable jacket 322 (FIG. 17) as will be explained. In addition, the material selected for the second non-adhesive material 308 has favorable perforation tear characteristics, and in the illustrated embodiment second material 308 is stiffer than first material 304. The silicon-coated outer surface 310 of non-adhesive material 308 is free of adhesive.

A print-on or pre-printed label area 312 is located on a side of first clear material 304 opposite to adhesive layer 306 as seen in FIG. 16. The surface of label area 312 directed away from first clear material 304 has a surface adapted to receive cable-identifying indicia applied thereto as is known in the art. A perforation 314 is located at or adjacent a portion 316 of second non-adhesive material 308. Perforation 314 also extends through a portion 318 of first clear material 304.

As seen in FIG. 16, the illustrated embodiment of the cable marker label 300, upon removal of substrate 302, includes the adhesive-coated anchor portion 320 on the underside of first clear material 304, which anchor portion extends between lines A'-B'. Portion B'-D' of cable marker label 300 includes a smooth, non-adhesive surface on the outer facing side 310 of second non-adhesive material 308. Lines B'-C' define the printed label area 312 on an opposite side of first clear material 304 from adhesive layer 306. Linear portion D'-E' of cable marker label 300 comprises first clear material 304 having a clear adhesive underside formed by adhesive material 306. The adhesive material 306 is transparent, allowing images beneath first clear material 304 to be visible to an observer.

Figure 17:
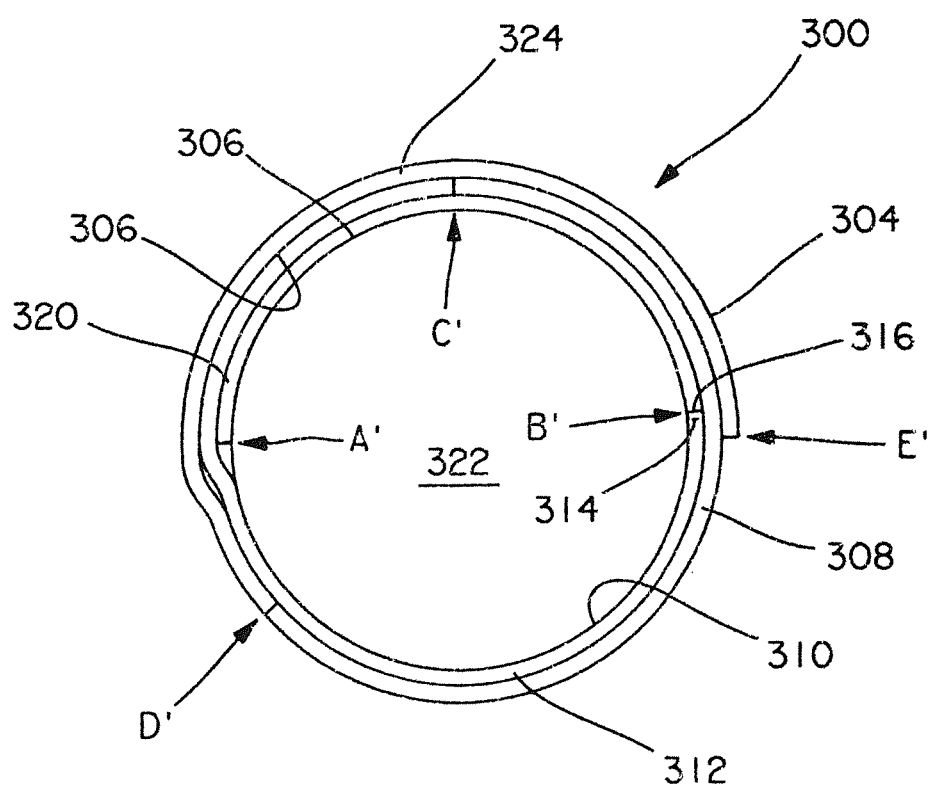
FIG. 17 is a cross-sectional view of the embodiment of the invention illustrated in FIG. 16 shown wrapped around a cable of small to medium diameter, and showing the various portions of the rotatable cable marker label.
Figure 18:
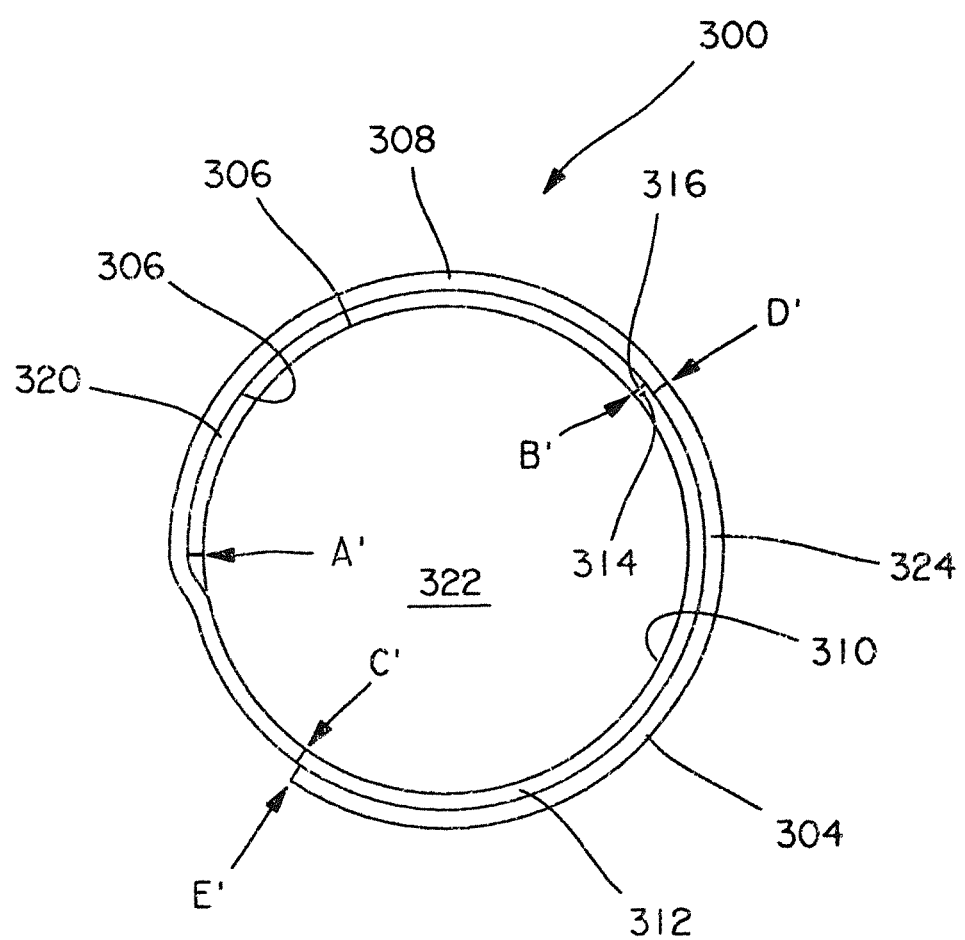
FIG. 18 is a cross-sectional view of the embodiment of the invention illustrated in FIG. 16, shown wrapped around a cable of medium to large diameter, and showing the various portions of the rotatable cable marker.

FIGS. 17 and 18 illustrate the cable marker label 300 of the embodiment of the invention shown in FIG. 16 installed on a cable 322, which cable is normally covered on its outer circumference by a cable jacket (not shown). FIG. 17 shows the label 300 wrapped around a relatively small to medium sized cable 322, such as an R100×150 CAT 5 installation. FIG. 18 shows the label 300 wrapped around a relatively medium to large cable 322, such as an R100×150 CAT 6 installation.

Referring to the illustrated embodiment of FIG. 17, after a marker label 300 is installed on a cable 322 using the method to be described, the anchor portion 320 is adhesively attached directly to cable 322, or the jacket surrounding cable 322, over the distance indicated by lines A'-B' in FIG. 17, which is approximately a one hundred eighty degree arc in the illustrated embodiment. The non-adhesive print area 312, which is typically pre-printed with cable identifying indicia, extends around cable 322 over an arcuate distance of approximately two hundred seventy degrees, as illustrated by the arc between lines B'-C' in FIG. 17. Arcs A'-B' and B'-C' will vary proportional to the diameter of cable 322. An end of print area 312 overlies an upper surface of a segment of adhesive anchor 320. As seen in FIG. 16, the underside segment B'-D' of first material 304 underlying print area 312 is attached to second adhesive-free material 308. Thus, the non-adhesive print area 312 (FIG. 17) does not adhere to either cable 322 or to anchor portion 320. In the embodiment of FIG. 17, the arc B'-D' extends over an angular distance of approximately four hundred ninety five degrees. This distance will vary proportional to the diameter of cable 322.

As seen in FIG. 17, the transparent segment of second non-adhesive material 308 extending beyond print area 312, which print area is formed with or attached to first clear material 304, extends around and overlies a segment of adhesive anchor portion 320, and also overlies a segment of the print area 312 as indicated by the arc C'-D' in FIG. 17. Since the underside of second material 308 is adhesive-free, second material 308 does not adhere to either adhesive anchor 320 or to print area 312. Also, the underside of print area 312 and the underside of second clear material 308 may be silicon coated, providing a low or negligible coefficient of friction between print area 312 and cable 322 over the circumference of cable 322 extending between B'-A' and between print area 312 and the upper surface of adhesive anchor 320 extending over the arc defined between lines A'-B' in FIG. 17.

The adhesive laminate segment 324 of adhesive-backed first clear material 304 is wrapped around, and adhered to, the upper surface of a portion of print area 312, and to the upper surface of a portion of second clear material 308 over the arc extending between D'-E' in FIG. 17. The arc D'-E' is approximately two hundred twenty five degrees in the embodiment of FIG. 17; however, this arc may vary depending upon the diameter of cable 322. Laminate segment 324 is transparent, and the adhesive layer 306 comprises a clear adhesive. Thus, the indicia on print area 312 are readable through both first material 304 and second material 308.

The perforation 314 extends through both first and second clear materials 304 and 308 at the approximate location shown in FIGS. 16 and 17 to allow segments of first and second clear materials 304, 308 to be separated from adhesive anchor portion 320, as will be described.

FIG. 18 illustrates the label 300 of the embodiment of the present invention shown in FIGS. 16-23 installed and wrapped around a medium to large sized cable. Like elements identified in FIG. 17 are designated by similar numerals in FIG. 18. In this installation of label 300 over a larger cable 322 compared to the cable depicted in FIG. 17, the adhesive anchor portion 320 of first clear material 304 is adhered to cable 322 over an arc of approximately one hundred thirty five degrees, along the circumferential distance A'-B' in FIG. 18. The non-adhesive print area 312 extends approximately one hundred eighty degrees over the arc designated B'-C' and the non-adhesive second clear material 308 extends over the arc designated B'-D' or approximately three hundred sixty degrees. Since the second clear material 308 is adhesive-free on its underside, and may be coated with a silicon material, there is no adhesion of second clear material 308 to either cable 322 or to the upper side of adhesive anchor 306.

Adhesive over-laminate segment 324 extends over, and is adhesively connected to, the outer surface of non-adhesive print area 312 over an arc of approximately one hundred eighty degrees, as designed by the arcuate distance D'-E' in FIG. 18. Over-laminate segment 324 is clear, and the adhesive on the underside of segment 324 is transparent, thus rendering the indicia printed on print area 312 visible to an observer. The over-laminate segment 324 also provides a clear protective layer over the print-on area 312.

Figure 19:
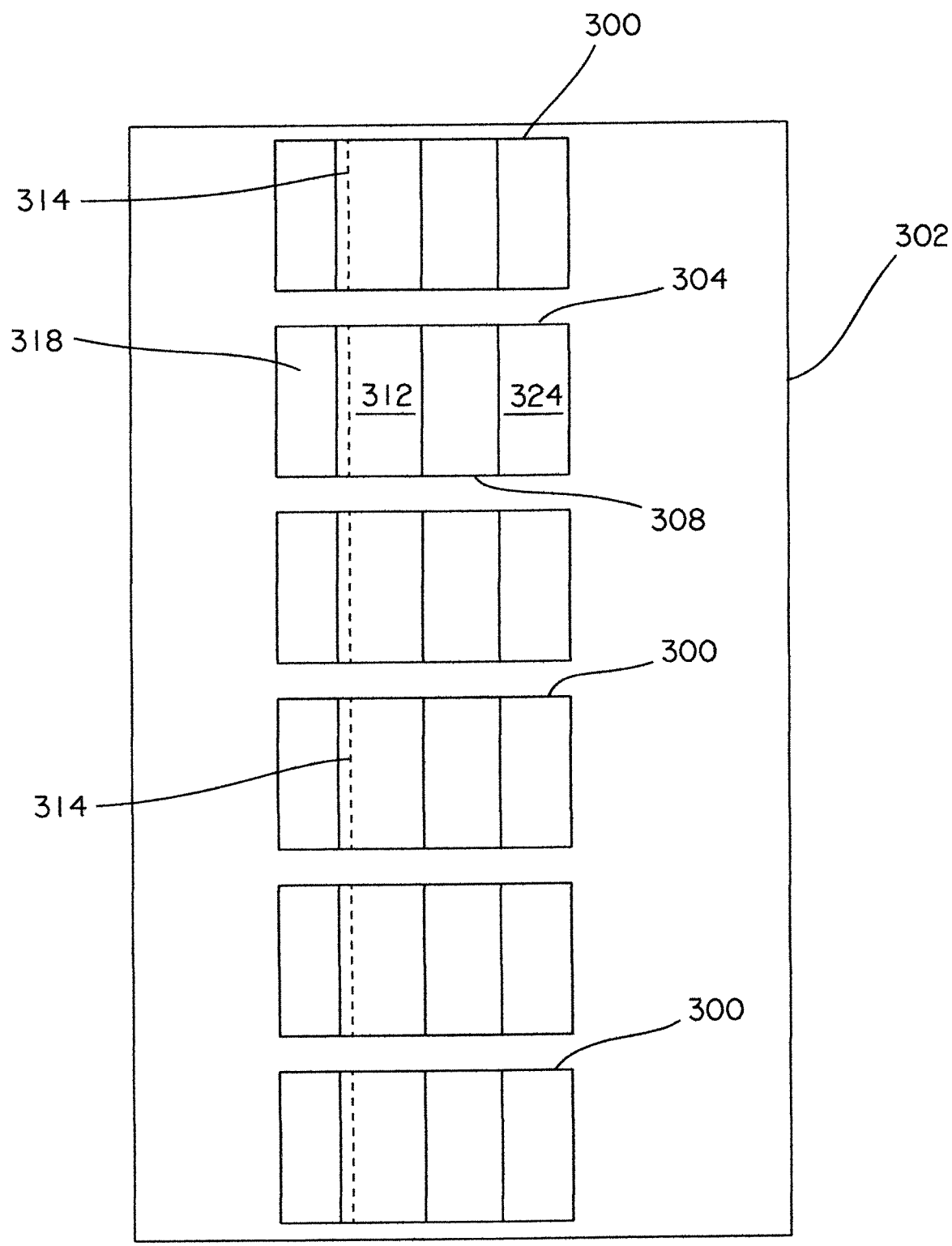
FIG. 19 is a plan view of a plurality of film and label combination strips of the embodiment of FIG. 16 adhered to a removable substrate following the mass production of the film and label combination of this embodiment of the invention.

FIG. 19 is a plan view of throw-away liner or substrate 302 to which a plurality of cable marker labels 300 have been attached for delivery to a user. Each label 300 is removably adhered to substrate 302 by the clear adhesive on the underside of end portion 318 and the underside of adhesive laminate segment 324 of first clear material 304. The adhesive-free second clear material 308 with a silicon coated underside extends between adhesive bearing end portion 318 and laminate segment 324, whereby the second clear material 308 is not adhered to the substrate 302. The perforation 314 extends through both first clear material 304 and second clear material 308, as described previously, of each label 300. The print-on label area 312 faces upward and forms a part of first clear material 304.

Figure 20:
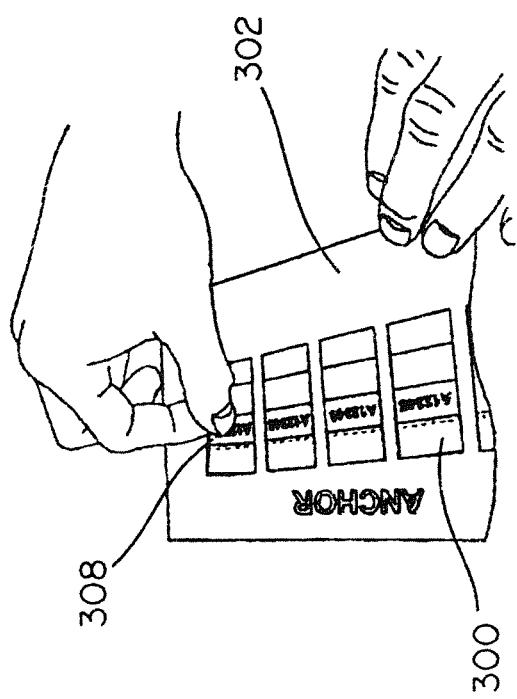

Upon applying the cable marker label 300 to the cables 322 illustrated in FIGS. 17 and 18, first the cable identifying indicia is printed on or otherwise applied to the outer or exposed surface of label area 312. Then, referring to FIG. 20, a label 300 is removed from the substrate 302, exposing the adhesive material 306 on one side of first clear material 304, which adhesive material does not cover the underside of second non-adhesive material 308. The second non-adhesive material 308 is adhered to one side of clear material 304 by adhesive layer 306. To easily remove the label 300 from substrate 302, a finger is slid under the second clear material 308, as seen in FIG. 20. The underside of material 308 is adhesive-free, and is not attached to substrate 308. Also, the adhesive layer 306 on the underside of end portion 318 and over-laminate segment 324 is not a strong adhesive, whereby the label 300 is readily removed from substrate 302.

Figure 21:
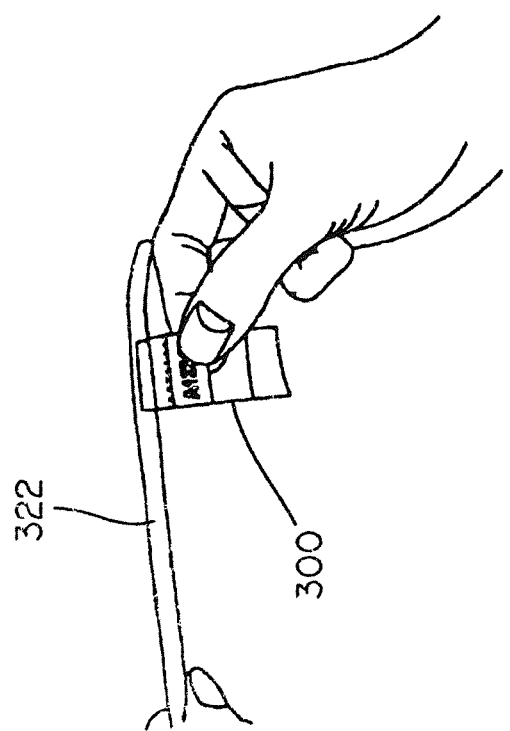
FIGS. 20-23 diagrammatically illustrate the steps of wrapping the transparent film and label combination strip of the embodiment of the present invention shown in FIG. 16 around a cable, including removing a cable marker label from a substrate, adhering the top adhesive-backed anchor end of the label to a cable outer jacket, wrapping the label around the cable jacket and over itself until completely wrapped, and rotating the label to break the label at its perforation.
Figure 22:
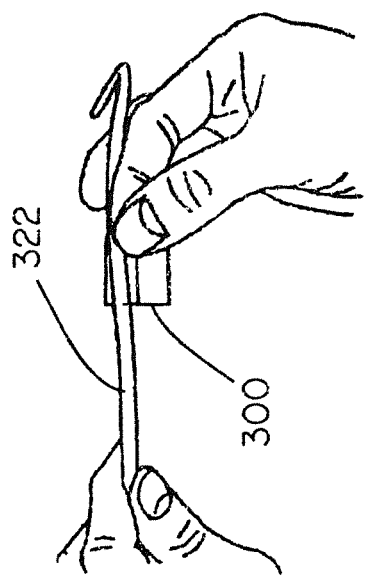

The adhesive anchor portion 320 of first clear material 304 is then attached to the outer surface of cable 322, and the cable marker label 300 is continually wrapped around the cable as shown in FIGS. 21 and 22, while adhesive anchor portion 320 attaches the portion A'-B' to the cable 322, preventing slippage of the cable marker label 300 around the cable. As the cable marker label 300 is wrapped around the cable, the non-friction areas B'-D' of second non-adhesive material 308 extend around the outer surface of cable 322 for a distance greater than three hundred sixty degrees in the embodiments of FIGS. 17 and 18, since the length of non-adhesive material 308 in those embodiments is greater than the circumferential dimension of the cable 322. For larger cable applications, the second non-adhesive material 308 may extend around the cable 322 over a lesser circumferential distance.

As the wrapping process continues as shown in FIGS. 21 and 22, the adhesive 306 at portion D'-E' of first clear material 304 extends over and beyond the portion of first clear material 304 comprising printed label area 312, thus over-lying the label area 312 with first clear material 304. The adhesive portion D'-E' of clear material 304 then adheres the leading portion of clear material 304 to the previously wound outer surface of clear material 304, as seen in FIGS. 17 and 18.

In the embodiment illustrated in FIGS. 16-23, the stiffness of second clear material 308 is greater than the stiffness of first clear material 304. As the label 300 is wrapped around cable 322, the stiffer second clear material provides an outward force tending to wrap the label 300 radially away from cable 322, providing a loose wrap enabling the label 300 to be installed easily over the cable, and to allow free rotation of the label 300 around the cable 322.

Figure 23:
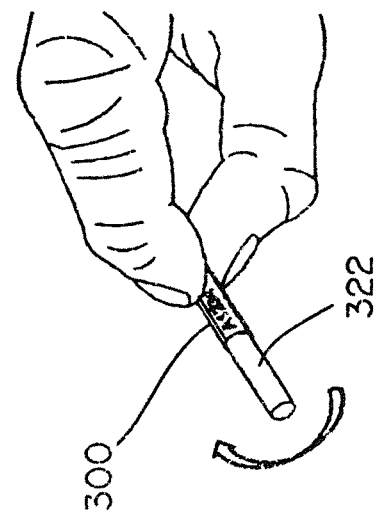

After the cable marker label 300 has been wound around cable 322 as described above, and as shown in FIGS. 17 and 18, a slight rotative force in the wrapping direction from portion A'-B' towards portion B'-C' is manually applied to the cable marker label, breaking perforation 314 and allowing second non-adhesive material 308, and the remainder of clear material 304 that is not adjacent and is linearly beyond adhesive anchor portion 320, to freely rotate around cable 322. Upon breaking perforation 314 as illustrated in FIG. 23, the low coefficient of friction non-adhesive inner side 310 of non-adhesive material 308 is capable of freely rotating around cable 322 to facilitate viewing of the indicia at any angle. Also, printed label area 312 is covered and protected by clear material 304 adhesively applied over the printed label area, thus preventing smudging or removal of the cable-identifying indicia applied to printed label area 312.

The present invention has been described as embodiments for applying a rotatable self-laminating marker label to a cable, where the label can be circumferentially moved around the cable for ease of reading at any orientation. It is to be understood that the label structure and application method disclosed herein can be used to apply identification labels to other devices, such as fluid conduits, axially moveable control wires, tubular static structures, or the like.

It should be noted that the above-described illustrated embodiments of the invention are not exhaustive of the form the self-laminating rotating cable marker label in accordance with the invention might take. Rather, the disclosed embodiments serve as exemplary and illustrative embodiments of the invention as presently understood. It is intended that the scope of the invention not be limited by the specification, but be defined by the claims set forth below.

What is claimed:

1. A self-laminating cable marker system comprising:
    a substrate;
    at least one cable marker at least partially adhered to the substrate wherein the cable marker has a first transparent portion, a second non-transparent portion next to the first portion and a third transparent portion having adhesive such that an underside of the third portion can adhere to a top side of the second portion when the self-laminating cable marker is wrapped around a cable, wherein the first portion is separable from the second portion via a perforation.

* * * * *